United States Patent [19]

Ruehl

[11] Patent Number: 4,493,580
[45] Date of Patent: Jan. 15, 1985

[54] RETAINING PRONG

[75] Inventor: William E. Ruehl, Wheeling, Ill.

[73] Assignee: Illinois Tool Works, Inc., Chicago, Ill.

[21] Appl. No.: 616,623

[22] Filed: Jun. 4, 1984

Related U.S. Application Data

[63] Continuation of Ser. No. 391,787, Jun. 24, 1982, abandoned.

[51] Int. Cl.³ ............................................. E04G 3/00
[52] U.S. Cl. ............................... 403/252; 174/138 D;
248/220.2; 248/220.3; 248/222.1
[58] Field of Search ............... 248/220.3, 220.2, 221.3,
248/222.1, 222.2, 223.1, 73, 235, 239; 403/252;
174/138 D, 164

[56] References Cited

U.S. PATENT DOCUMENTS

| | | | |
|---|---|---|---|
| 3,015,869 | 1/1962 | Rapata | 248/73 |
| 3,628,762 | 12/1971 | Williams | 248/222.2 |
| 3,688,635 | 9/1972 | Fegen | 174/138 D |
| 3,970,276 | 7/1976 | Debaigt | 248/221.3 |
| 4,103,854 | 8/1978 | Pliml et al. | 248/235 |
| 4,297,769 | 11/1981 | Coules | 174/138 D |
| 4,301,986 | 11/1981 | Morel | 248/221.3 |
| 4,369,947 | 1/1983 | Kuwano | 174/164 |
| 4,375,879 | 3/1983 | Kojima et al. | 248/73 |

Primary Examiner—William H. Schultz
Assistant Examiner—Ramon O. Ramirez
Attorney, Agent, or Firm—Thomas W. Buckman; John P. O'Brien

[57] ABSTRACT

The disclosed invention is a plastic fastening device which can be easily manipulated into engagement with an apertured panel. The device includes a fastening means extending perpendicular from one side of a base. The fastening means has a generally hook-shaped configuration characterized by a trunk portion, a curved transition portion and a tip portion. The fastening device has a generally elongated stem which is used as a lever arm to move the fastening means from a skewed, partially engaged position with respect to the panel to a final fully engaged position.

3 Claims, 5 Drawing Figures

4,493,580

RETAINING PRONG

This is a continuation of U.S. Ser. No. 391,787, filed Jun. 24, 1982, entitled Retaining Prong, now abandoned.

BACKGROUND AND SUMMARY OF THE INVENTION

The invention relates to retaining and support devices which are mounted to apertured panels. More particularly, the invention relates to resilient plastic devices which are manipulated into engagement with apertured panels of varying thicknesses and aperture sizes.

Retaining and support devices of the prior art generally require complex manipulation in order to be installed. For example, U.S. Pat. No. 3,015,869 shows a hook-like stud which must be maneuvered into position by two dimensional translation as well as rotation of the fastener to allow a portion of the stud to engage the back side of the panel into which it is installed. Other devices such as those shown in U.S. Pat. Nos. 2,542,753 and 4,103,854 are examples of prior art devices which require complex manipulation to be installed.

It is an object of the present invention to provide a novel one-piece plastic fastener which can be easily installed in an apertured panel by simple manipulation.

Another object of the invention is to provide a fastener which is securely held in assembled relationship to panels having different thicknesses and aperture sizes.

Still another object is to provide an easily installed fastener which is adapted to retain or support various articles in a spaced relationship with an apertured panel.

A device embodying the present invention comprises a fastener means extending from one side of a base member. The fastener means is connected to the base by a trunk portion having a notch formed thereon. A resilient curved transition portion interconnects the trunk portion to a tip portion. The notch on the trunk portion has a V-shaped configuration. One of the surfaces of the V-shaped notch engages the side of an aperture in a panel when the fastener is in a skewed partially engaged position. An elongated stem of secondary fastener means extends from the other side of the base and is used as a lever arm to move the fastener means from the skewed position to a final fully engaged position. In the final position, a notch formed in the tip portion engages the opposite side of the aperture and retains the fastener in assembled relationship to a panel.

The objects and advantages of the invention will become apparent from the following description and accompanying drawings.

DETAILED DESCRIPTION OF THE PREFERRED EMBODIMENT

Figure 1:
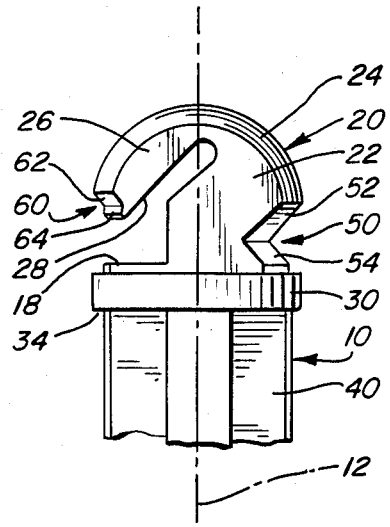
FIG. 1 is a side elevational view of the preferred embodiment of the invention.
Figure 2:
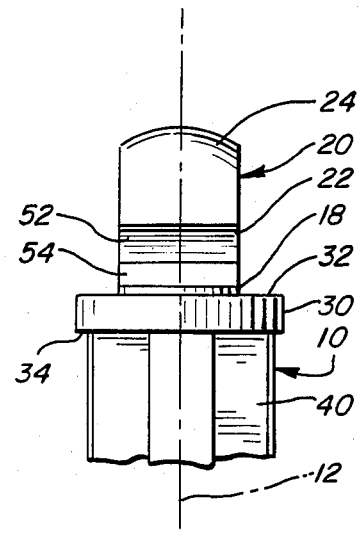
FIG. 2 is an end view of the preferred embodiment of the invention.

Referring now more specifically to the drawing wherein like parts are designated by the same numerals through the various figures, FIGS. 1 and 2 show a fastener 10 made of resilient molded plastic which is firm yet flexible such as natural nylon or similar material. The fastener 10 includes a fastener means 20 extending from one side 32 of a base 30 and the stem 40 of a second fastener means (not shown) extending from the opposite side 34.

The fastener means 20 has a generally hook-shaped configuration which extends from a rigid trunk 22. One end of the trunk 22 is secured to side 32 of base 30. A flexible curved transition portion 24 interconnects trunk 22 to tip portion 26. Tip portion 26 is in a spaced relationship to said trunk 22 and that relationship defines a slot 28. The slot is generally at an acute angle to axis 12 of the fastener, the axis 12 being perpendicular to the base 30.

Preferably the fastener has a collar 18 adjacent the base 30, shaped to match the aperture into which the fastener is inserted. The collar 18 helps to resist forces applied to the fastener in any direction parallel to the plane of the panel.

The trunk 22 includes a V-shaped notch 50 with a first surface 52 farther from the base 30 than a second surface 54. The first surface 52 of the notch is generally parallel to the slot 28.

The tip portion 26 also includes a notch 60 with a latching surface 62 and a second surface 64. Latching surface 62 extends at an acute angle relative to axis 12 on the side opposite to the acute angle between first surface 52 of V-shaped notch 50 and axis 12.

Figure 3:
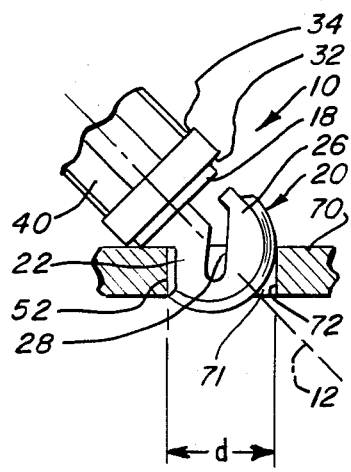
FIGS. 3, 4 and 5 are elevational views in partial section of the preferred embodiment of the present invention showing initial, intermediate and final positions respectively during installation in an apertured panel.
Figure 4:
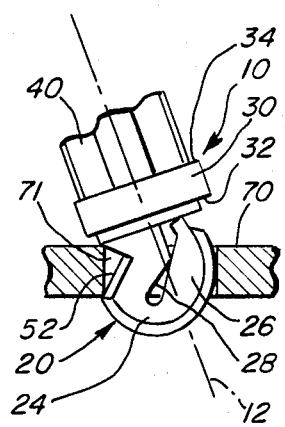

FIG. 3 shows the fastener 10 in skewed partially engaged position with respect to a panel 70. In the skewed position the maximum transverse dimension d of the fastener means 20, measured in a plane parallel to the panel 70, is less than or equal to the size of the aperture 71. This allows the fastener to be easily inserted into the aperture 71 by a simple one dimensional movement of the fastener in a direction perpendicular to the panel. The first surface 52 of the notch 50 engages against the inner surface 72 of the aperture 71 in the panel 70. The fastener 10 is moved from the skewed position by using the stem 40 as a lever arm. During this movement, the tip portion 26 is resiliently deflected toward the trunk portion 22 as seen in FIG. 4.

Figure 5:
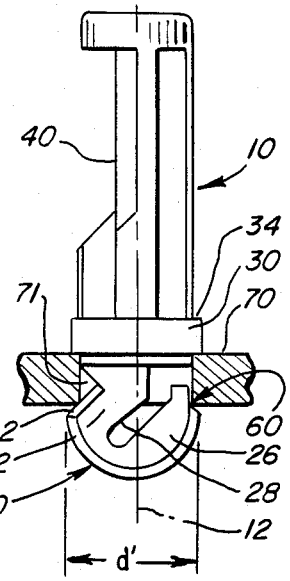

FIG. 5 shows the fastener in its final fully engaged position. In this position, the maximum transverse dimension d' of the fastener means 20 measured in a plane parallel to the panel 70 is greater than the size of the aperture 71 to provide for locking engagement of the fastener with the panel. When the fastener is moved into final position, the resiliency of the curved portion 24 causes the tip portion 26 to spread away from the trunk 22 allowing the notches 50 and 60 to resiliently engage opposite sides of the aperture 72.

As depicted in FIGS. 1 and 2, fastener 10 is adapted to be inserted in a round or partially rounded aperture. The resilient curved portion 24 is rounded across the width dimension (FIG. 1) and across the depth dimension (FIG. 2). The first surfaces 52 and 62 of the notches 50 and 60, respectively, form portions of an imaginary cone in alignment with axis 12 so that in a fully engaged position, the surface 52 and latching surface 62 will conform to a round or partially round aperture. The spreading resilience of the tip portion 26 together with the conical notch surfaces 52 and 62 make the fastener usable in panels of varying thicknesses.

It is significant in this embodiment that the slot 28 is oriented at an angle with respect to the axis 12. The angled relationship allows the fastener to be installed in panels having a variety of both thickness and aperture size. As the tip portion 26 deflects, the notch 60 travels along an arcuate path. The intersection of the first and second surfaces 62 and 64 likewise travels an arcuate path. The range of aperture sizes and thicknesses capable of retaining the fastener 10 corresponds to the locus of points along the path travelled by the intersection of the first and second surfaces 62 and 64. The angled orientation of the slot provides a greater range of capability.

In the above description the stem 40 of a fastener means is used as a lever arm to deflect the tip portion 26 and to move the fastener into engagement with a panel.

It is obvious that many structural details of the present invention may be changed without departing from the spirit and scope of the appended claims.

I claim:

1. A plastic fastener comprising:
   a base;
   a fastener means extending from one side of said base for attaching said fastener to a panel having an aperture, said fastener means having an axis perpendicular to said base, said fastener means including:
   a collar having one side secured to said base and symmetrically disposed relative to said axis,
   a trunk portion having one end extending from the other side of said collar,
   a V-shaped notch on said trunk for engaging one side of said aperture,
   first and second surfaces forming said V-shaped notch, said first surface being further from said base than said second surface, said first surface extending at an acute angle relative to said axis,
   a resilient curved transition portion formed at the other end of said trunk, and having an outer curved surface,
   a tip portion connected to said portion, said tip portion having a second notch for engaging an opposite side of said aperture, said second notch having a latching surface that extends at an acute angle to said axis, said tip portion separated from said trunk by a slot, said slot extending at an acute angle relative to said axis in the same general direction as said first surface extending from the opposite side of said base which provides a lever arm for moving said fastener from said skewed position to a final position wherein said tip is resiliently deflected and said notches engage opposite sides of said aperture.

2. The fastener of claim 1, wherein said first surfaces of said V-shaped and said latching surface form portions of a conical surface whereby said fastener is adapted to be retained in a rounded aperture.

3. The fastener of claim 1, wherein said resilient curved transition portion has a rounded curvature in two dimensions which are at ninety degree orientation with each other.

* * * * *